United States Patent [19]

Horiike et al.

[11] Patent Number: 4,917,209

[45] Date of Patent: Apr. 17, 1990

[54] MOTORCYCLE

[75] Inventors: Satoru Horiike, Tokyo; Yasuhiko Nakano, Shiki; Shigetarou Okano, Tokorozawa; Shigeru Kimura, Asaki; Masanobu Matsuzaki, Tokyo; Toshiteru Yamamoto, Saitama; Kenji Ooki, Asaka; Eiji Hamano, Tokyo; Mikio Kubo, Fujimi, all of Japan

[73] Assignee: Honda Giken Kogyo Kabushiki Kaisha, Tokyo, Japan

[21] Appl. No.: 219,508

[22] Filed: Jul. 15, 1988

Related U.S. Application Data

[62] Division of Ser. No. 168,110, Mar. 11, 1988.

[30] Foreign Application Priority Data

Mar. 13, 1987 [JP] Japan .................................. 62-59236
Aug. 18, 1987 [JP] Japan .................................. 62-203511
Aug. 19, 1987 [JP] Japan .................................. 62-204163

[51] Int. Cl.$^4$ .................... B62M 27/02; B60G 9/02
[52] U.S. Cl. ..................................... 180/219; 180/223; 280/112.2
[58] Field of Search ............... 180/213, 9.26, 219, 180/223, 227; 280/112.2

[56] References Cited

U.S. PATENT DOCUMENTS 3,912,031 10/1975 Goulet .................................. 180/9.26
4,666,018 5/1987 Shibuya .................................. 180/213

FOREIGN PATENT DOCUMENTS 2583704 12/1986 France .

Primary Examiner—Charles A. Marmor
Assistant Examiner—Donn McGiehan
Attorney, Agent, or Firm—Armstrong, Nikaido, Marmelstein, Kubovcik & Murray

[57] ABSTRACT

A motorcycle has a frame assembly including a main frame supporting front and rear wheels on a central line thereof. A connecting means mounted on the main frame between the front and rear wheels, and a subframe is mounted on the connecting member and being capable of banking laterally about the connecting member. At least one of the front and rear wheels is a drive wheel. At least the drive wheel is capable of preventing the main frame from banking laterally. Centrifugal forces generated upon cornering are counterbalanced by centripetal forces produced when only the subframe banks laterally. The drive wheel supported on the main frame which does not bank has an increased road gripping force. Thus, high-speed cornering is made possible.

10 Claims, 30 Drawing Sheets

MOTORCYCLE

This is a division, of application Ser. No. 168,110 filed Mar. 11, 1988.

BACKGROUND OF THE INVENTION

The present invention relates to a motorcycle.

When a motorcycle makes a turn or corners, centrifugal forces produced dependent on the weight of the motorcycle, the speed of travel of the motorcycle, and the cornering radius are counterbalanced by centripetal forces generated by causing the motorcycle to bank.

Conventional motorcycles have unitary frames supporting front and rear wheels. Upon cornering at high speed, the motorcycle frame is required to bank to a large degree.

The front and rear wheels supported on general motorcycle frames have tires of circular cross section which are shaped to allow the motorcycle frames to bank.

When the motorcycle runs along a corner, the side forces imposed on the front and rear wheels that are inclined or bank laterally are increased in proportion to the banking angle of the frame.

At the time a conventional motorcycle corners at a high speed such as during sports racing, however, the motorcycle speed has to be lowered.

SUMMARY OF THE INVENTION

In view of the aforesaid disadvantage, it is an object of the present invention to provide a motorcycle capable of cornering at high speed.

To achieve the above object, there is provided in accordance with the present invention a motorcycle comprising: front and rear wheels; a frame assembly including a main frame supporting the front and rear wheels on a central line thereof, a connecting means mounted on the main frame between the front and rear wheels, and a subframe mounted on the connecting means and being capable of banking laterally about the connecting means; and at least one of the front and rear wheels being a drive wheel, at least the drive wheel being capable of preventing the main frame from banking laterally.

A front wheel steering handle and a driver's riding seat are mounted on the subframe, and footsteps are mounted on the main frame.

A mechanism is provided for limiting a range in which the subframe banks.

The connecting means includes a connecting shaft in a longitudinal direction of the frame assembly.

With the above arrangement, centrifugal forces generated upon cornering are counterbalanced by centripetal forces produced when only the subframe banks laterally, and the drive wheel supported on the main frame which does not bank has an increased road gripping force, so that high-speed cornering is made possbile.

According to the present invention, there is also provided a motorcycle comprising: front and rear wheels; a frame assembly including a front frame supporting the front wheel, a main frame supporting the rear wheel, and a connecting means interconnecting the front and main frames in a longitudinal direction of the frame assembly; and the front frame being capable of banking laterally about the connecting means, the rear wheel being capable of preventing the main frame from banking laterally.

The rear wheel includes a flat tire of a U-shaped cross section.

Alternatively, the rear wheel includes a tire having a flat portion centrally at a surface thereof for contact with ground.

A steering handle is mounted on the front frame for steering the front wheel, a seat frame is mounted on the front frame and extending above the main frame, and a driver's riding seat and footsteps are mounted on the seat frame.

The footsteps extend downwardly along outer surfaces of the main frame.

With the above motorcycle, centrifugal forces generated upon cornering are counterbalanced by centripetal forces produced when the front frame banks laterally, and the rear wheel supported on the main frame which does not bank has an increased road gripping force, so that high-speed cornering is made possbile.

According to the present invention, there is further provided a motorcycle comprising: front and rear wheels; a frame assembly including a front frame supporting the front wheel, a main frame supporting the rear wheel, and a connecting means interconnecting the front and main frames in a longitudinal direction of the frame assembly; the front frame being capable of banking laterally about the connecting means, the rear wheel being capable of preventing the main frame from banking laterally; and a seat frame swingably mounted on the front frame.

A steering handle is mounted on the front frame for steering the front wheel, the seat frame extending above the main frame, a driver's riding seat is mounted on the seat frame, and footsteps are mounted on the main frame.

Alternatively, a steering handle is mounted on the front frame for steering the front wheel, the seat frame extending above the main frame, and a driver's riding seat and footsteps are mounted on the seat frame.

A mechanism is provided for limiting a range in which the front frame banks.

The seat frame has a device for angularly moving the seat frame according to a banking angle of the front frame.

The device includes means for angularly moving the seat frame in a direction in which the front frame banks.

It is possible to counterbalance centrifugal forces generated upon cornering and centripetal forces produced when the front frame and the seat frame are caused to bank laterally and the seat frame is angularly moved in a horizontal direction. The banking angle of the front frame is smaller and the burden on the front wheel is smaller by an extent commensurate with the centripedal forces produced by angularly moving the seat frame.

Since the seat frame can be angularly moved in the same direction as the banking direction of the front frame, the degree to which the front frame banks is reduced for high-speed cornering.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
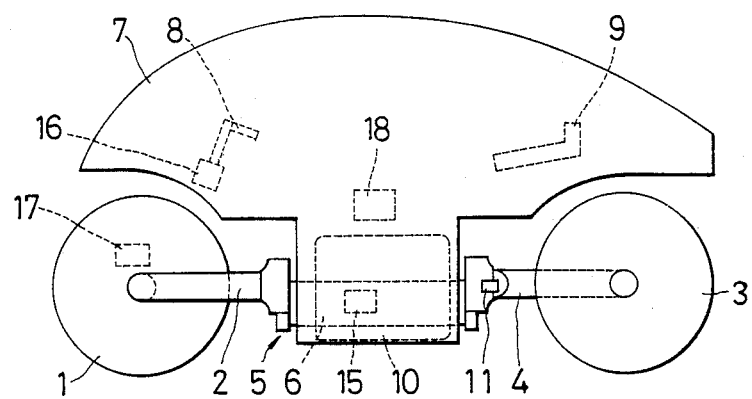
FIG. 1 is a side elevational view of a motorcycle according to an embodiment of the present invention.

A motorcycle according to an embodiment of the present invention will hereinafter be described with reference to FIGS. 1 through 6.

A motorcycle has a frame assembly including a main frame 5 supporting, on a central line C0, a front wheel 1 suspended by a swing arm 2 and a rear drive wheel 3 suspended by a swing arm 4, and a subframe 7 mounted on a connecting shaft 6 disposed on the central line of the frame assembly between the front and rear wheels 1, 3, the subframe 7 being capable of banking or being angularly movable laterally about the connecting shaft 6.

Figure 2:
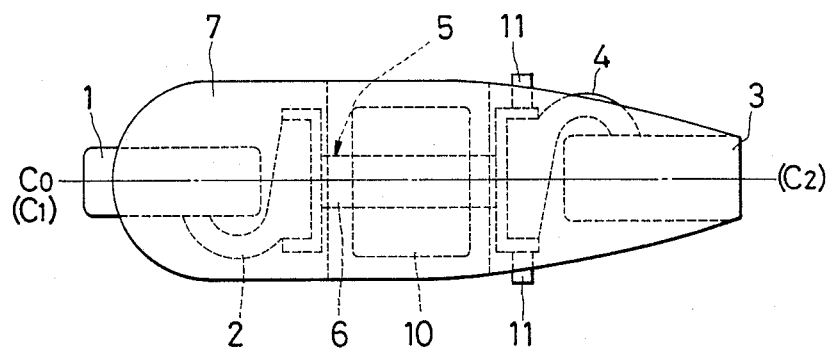
FIG. 2 is a plan view of the motorcycle shown in FIG. 1.
Figure 3:
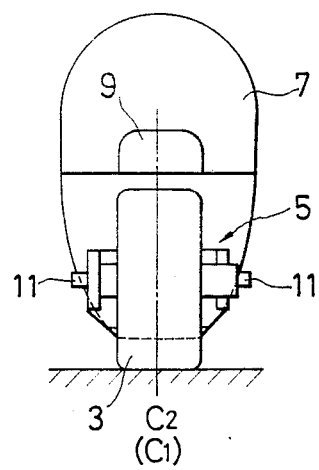
FIG. 3 is a rear elevational view of the motorcycle of FIG. 2.

As shown in FIG. 2, the front and rear wheels 1, 3 are suspended by the respective swing arms 2, 4 which are of a cantilevered configuration. As shown in FIGS. 2 and 3, the front and rear wheels 1, 3 include flat tires of a substantially U-shaped cross section. At least the rear wheel 3 is of width large enough to prevent the main frame 5 from banking laterally.

The subframe 7 can freely bank laterally of the motorcycle about the connecting shaft 6. The subframe 7 has a return mechanism (not shown) such as a Neidhart spring mechanism for limiting the range in which the subframe 7 can bank and returning the subframe 7, so that when the driver does not perform banking action, the subframe 7 is kept in an upright position by the return mechanism. A front wheel steering handle 8 is disposed in a front portion of the subframe 7 above the front wheel 1, and operatively coupled to the front wheel 2 through a hydraulic pressure mechanism or a wire (not shown) for steering the front wheel 2 from the central line C0 to a direction C1 (FIG. 5).

A driver's riding seat 9 is disposed in a rear portion of the subframe 7 upwardly of the rear wheel 3.

A power unit 10 including an engine and associated components is mounted in the main frame 5 for driving the rear wheel 3. Footsteps 11 are positioned below the drive's riding seat 9 on opposite sides of the main frame 5.

Figure 5:
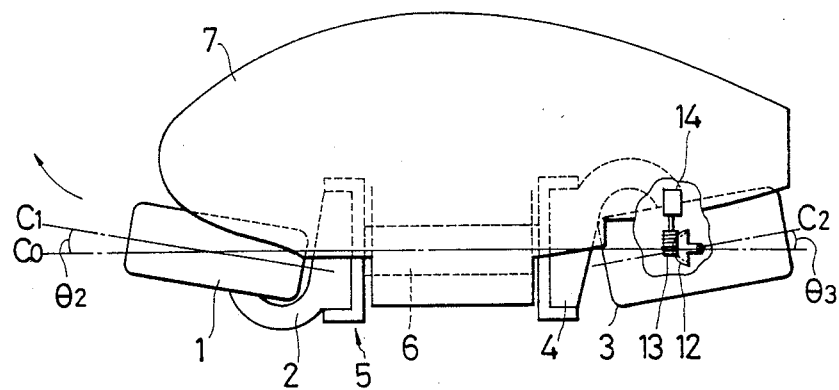
FIG. 5 is a plan view of the motorcycle upon cornering.
Figure 6:
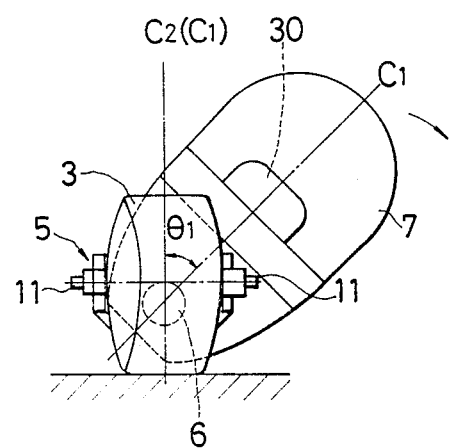
FIG. 6 is a rear elevational view of the motorcycle shown in FIG. 5.
Figure 7:
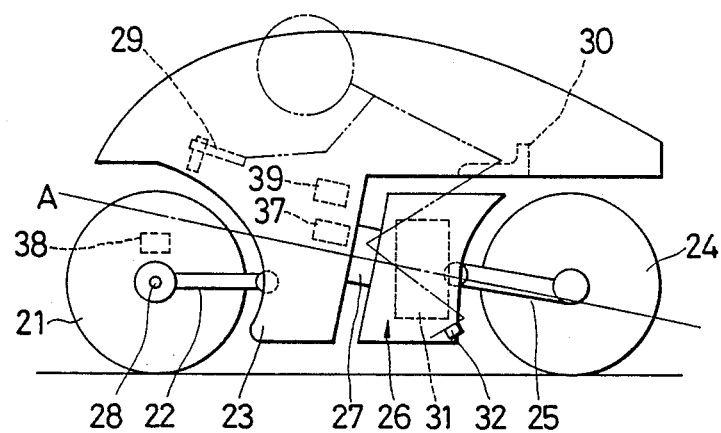
FIG. 7 is a side elevational view of a motorcycle according to another embodiment of the present invention.

The rear wheel 4 is associated with a rear wheel steering mechanism as shown in FIG. 5.

The steering mechanism for the rear wheel 4 includes a drive mechanism which comprises a sector gear 12 mounted on the axle of the rear wheel 4, a worm gear 13 meshing with the sector gear 12, and a motor 14 for rotating the worm gear 13. The worm gear 13 and the motor 14 are mounted on the swing arm 4.

Figure 4:
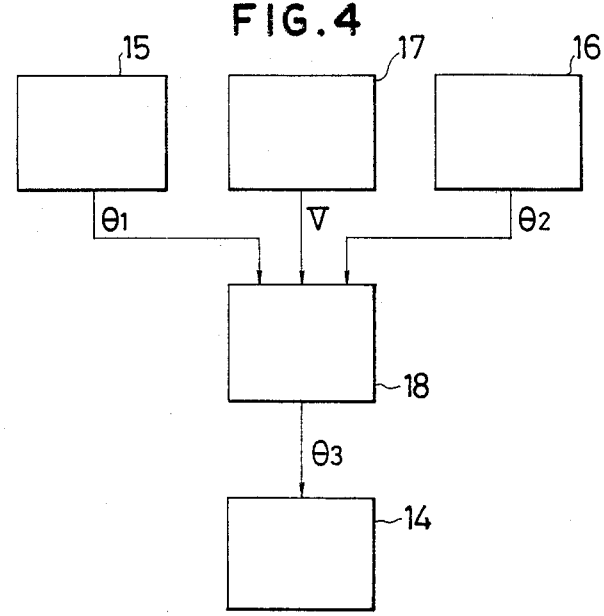
FIG. 4 is a block diagram of rear wheel steering control system for the motorcycle of FIG. 1.

The drive mechanism for steering the rear wheel 4 is controlled by input signals such as of a banking angle $\theta1$ of the subframe 7, a steering angle $\theta2$ of the handle 8, and a motorcycle speed V, as shown in FIG. 4. More specifically, the banking angle $\theta1$ is detected by a banking angle sensor 15 disposed around the connecting shaft 6 of the subframe 7, the steering angle $\theta2$ is detected by a steering angle sensor 16 attached to a steering shaft of the handle 8, and the motorcycle speed V is detected by a speed sensor 17 associated with the front wheel 1. These sensors may be of known nature. A control unit 18 comprising comparator circuits is mounted in the subframe 7.

The signals generated by these sensors are applied to the control unit 18, which then detects a rear wheel steering angle $\theta 3$ according to a predetermined program. A signal representing the rear wheel steering angle $\theta 3$ is applied by the control unit 18 to the rear wheel steering mechanism to energize the motor 14 for a corresponding angular displacement. The rear wheel 3 is now turned to shift its direction C2 through the angle $\theta 3$ as shown in FIG. 5.

Operation of the motorcycle will be described below. In FIGS. 2 and 3, the motorcycle is shown as running along a straight line with the subframe 7 being in the upright position without banking. At this time, the directions C1, C2 of the front and rear wheels 2, 3 are aligned with the central line C0 of the frame assembly.

When cornering to the right, for example, the driver causes the subframe 7 to bank about the connecting shaft 6 toward the center of the cornering circle while bracing his legs on the footsteps 11. The subframe 7 together with the driver now banks or is inclined laterally for cornering.

Since the front and rear wheels 1, 3 employ flat tires for larger areas of contact with ground, the main frame 5 is prevented from banking laterally regardless of the banking action of the driver. Therefore, the rear wheel 3 can produce large driving forces, and can also generate large accelerating and braking forces. The speed of the motorcycle upon cornering can be increased since the road gripping force of the rear wheel 3 is large.

Inasmuch as the footsteps 11 are mounted on the main frame 5 which does not bank, the driver can easily control the amount of banking of the subframe 7 under reactive forces produced by bracing his legs on the footsteps 11. The engine and associated components which require relatively large transverse dimensions are immovably supported on the main frame 5, the engine can be located in a low position to reduce centrifugal forces generated upon cornering for thereby facilitating high-speed cornering. For cornering at a small radius at a low speed, the rear wheel 3 is steered by the rear wheel steering mechanism shown in FIG. 5.

At this time, the signals indicative of the banking angle $\theta 1$ detected by the banking angle sensor 15, the steering angle $\theta 2$ detected by the steering angle sensor 16, and the motorcycle speed V detected by the speed sensor 17 are applied to the control unit 18, and the control unit 18 determines a rear wheel steering angle $\theta 3$ based on which the motor 14 is energized. The worm gear 13 and the sector gear 12 are turned through a prescribed angle for turning the direction C2 of the rear wheel 3 off the central line C0 through an angle corresponding to the rear wheel steering angle $\theta 3$. As a result, the direction C2 of the rear wheel 3 is oriented outwardly of the point of contact of the front wheel 1 with ground, so that a righthand moment is generated about the point of contact of the front wheel 1 with ground, allowing the motorcycle to make a small turn.

Upon cornering at a small radius at a low speed, the rear wheel 3 is steered in the direction opposite to the front wheel 1 by the rear wheel steering mechanism. Upon high-speed cornering, the the rear wheel 3 is steered in the same direction as the front wheel 1 by the rear wheel steering mechanism.

FIGS. 7 through 12 illustrate a motorcycle according to another embodiment of the present invention.

The motorcycle includes a front frame 23 supporting a front wheel 21 suspended by a swing arm 22 and a main frame 26 supporting a rear wheel 24 suspended by a swing arm 25, the front and main frames 23, 26 being coupled by a connecting shaft 27 extending longitudinally of the motorcycle. The front frame 23 is capable of banking laterally of the motorcycle about the connecting shaft 27. The rear wheel 24 includes a wide flat tire of a substantially U-shaped cross section for preventing the main frame 26 from banking about the connecting shaft 27. The front wheel 21 includes a normal round tire. The connecting shaft 27 has an axis A passing upwardly of an axle 28 of the front wheel 21. The front frame 23 supports a front wheel steering handle 29 and a drive's riding seat 30. The main frame 26 supports a power unit 31 comprising an engine and associated parts, and footsteps 32.

Figure 8:
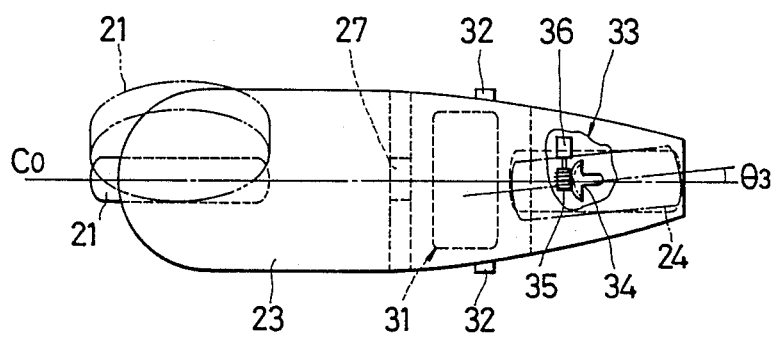
FIG. 8 is a plan view of the motorcycle illustrated in FIG. 7.
Figure 9:
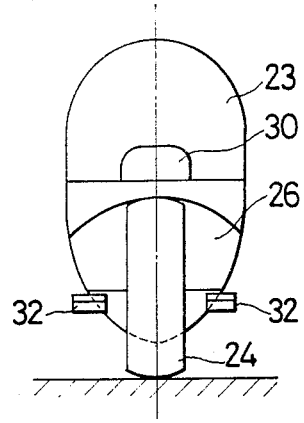
FIG. 9 is a rear elevational view of the motorcycle of FIG. 8.

The rear wheel 24 is coupled to a rear wheel steering mechanism including a drive mechanism 33 for laterally turning the rear wheel 24, and a control system for controlling the drive mechanism 33. As shown in FIG. 8, the drive mechanism 33 comprises a sector gear 34 mounted on the axle of the rear wheel 24, a worm gear 35 meshing with the sector gear 34, and a motor 36 for rotating the worm gear 35.

Figure 10:
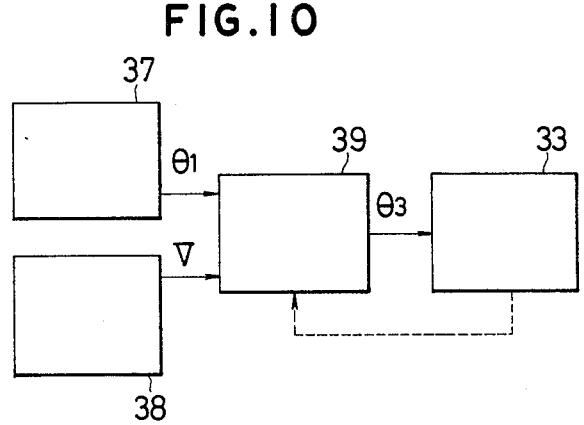
FIG. 10 is a block diagram of a rear wheel steering control system for the motorcycle of FIG. 7.

The drive mechanism 33 for steering the rear wheel 24 is controlled as follows: Signals of a banking angle $\theta 1$ and a motorcycle speed V are applied from a front frame banking angle sensor 37 (FIG. 7) disposed between the front frame 23 and the connecting shaft 27 and a speed sensor 38 associated with the front wheel 21 to a control unit 39 (FIG. 10).

The control unit 39 then detects a rear wheel steering angle $\theta 3$ according to a predetermined program. A signal representing the rear wheel steering angle $\theta 3$ is applied by the control unit 39 to the drive mechanism 33 (FIG. 8) to energize the motor 36 for a corresponding angular displacement. The warm gear 35 and the sector gear 34 are now turned a given angle to turn the rear wheel 24 from the central line C0 laterally through the angle $\theta 3$ as shown in FIG. 8.

Figure 11:
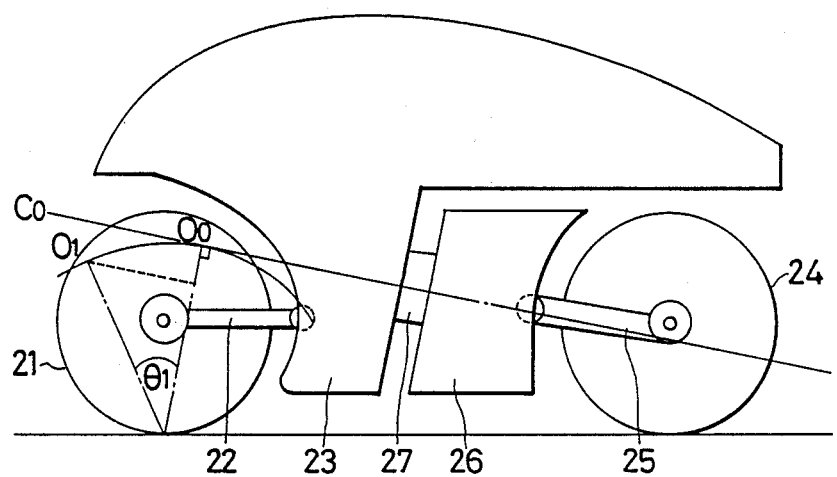
FIG. 11 is a side elevational view of the motorcycle upon cornering.
Figure 12:
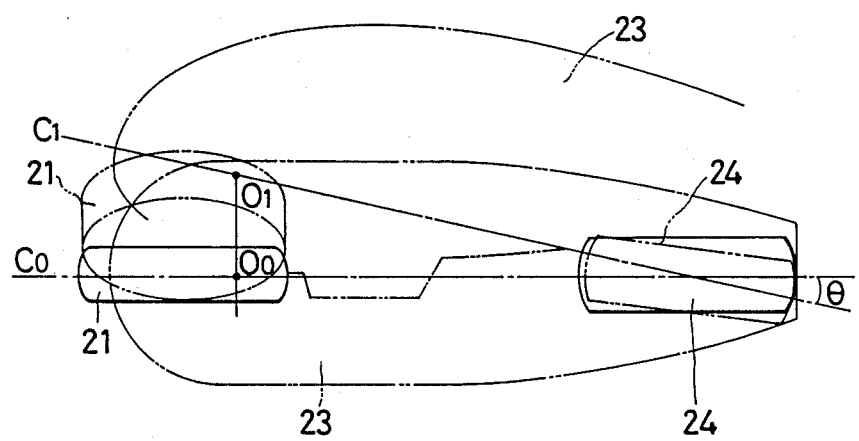
FIG. 12 is a plan view of the motorcycle upon cornering.
Figure 13:
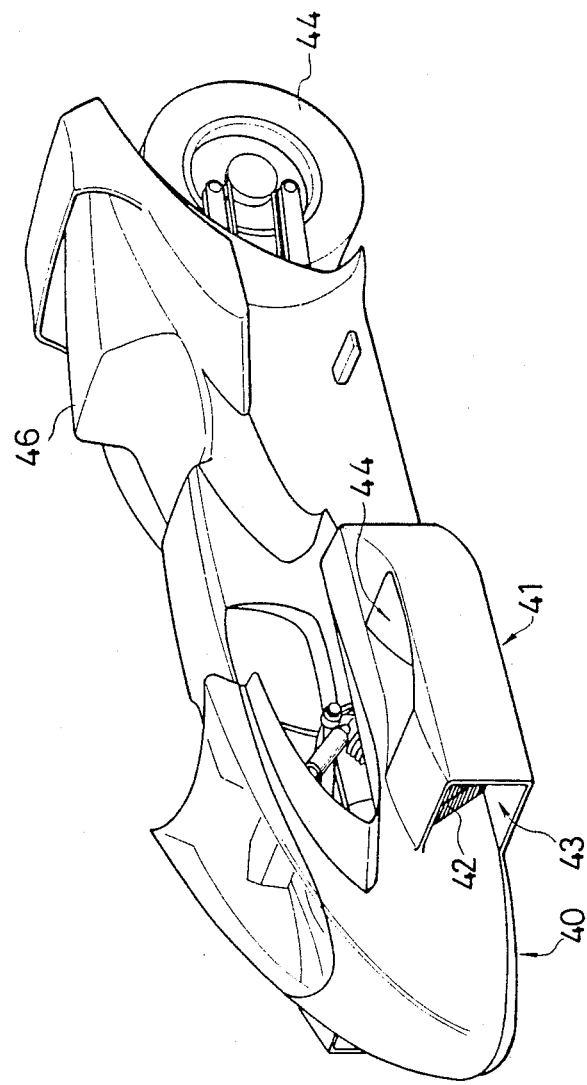
FIGS. 13, 14, and 15 are perspective, side elevational, and front elevational views of a motorcycle according to still another embodiment of the present invention.
Figure 14:
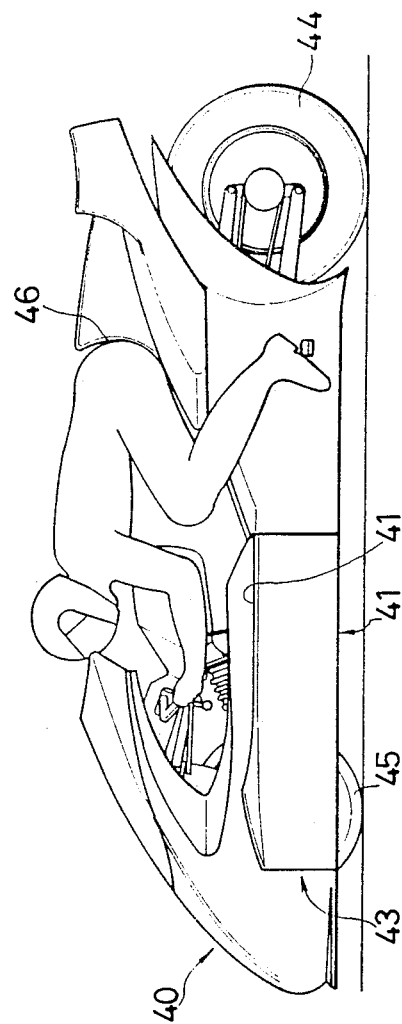
Figure 15:
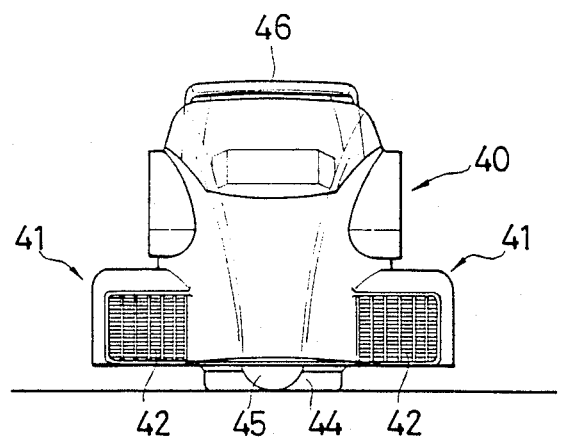

Operation of the motorcycle upon cornering as shown in FIGS. 11 and 12 will be described below. For high-speed cornering to the right, for example, the driver causes the main frame 23 with the front wheel 21 to bank or be tilted toward the center of the cornering circle while bracing his legs on the footsteps 32, as shown in FIG. 12, in order to counterbalance centrifugal forces. The main frame 26 with the rear wheel 24 which does not permit banking remains upright in a direction substantially normal to ground.

At this time, the front frame 23 and the front wheel 21 are caused to bank about the connecting shaft 27 through the banking angle 81, and the axis A of the connecting shaft 27 s moved from a position O0 above the point of contact of the front wheel 21 with ground to a position O1 closer to the center of the cornering circle.

Since the main frame 26 is displaced toward the center of the cornering circle about the point of contact of the rear wheel 24 with ground, the rear wheel 24 is automatically steered through an angle $\theta$ toward the center of the cornering circle as indicated by the imaginary lines.

The banking movement of the front frame 23 and the steering action of the rear wheel 24 are effective to improve the cornering characteristics of the motorcycle in a high-speed range.

When cornering at a small radius at a low speed, the rear wheel 24 is steered away from the center of the cornering circle by the rear wheel steering mechanism. At this time, as shown in FIG. 8, the drive mechanism 33 is operated by the control system to angularly shift the direction C2 of the rear wheel 24 away from the central line C0 of the motorcycle through the steering angle $\theta 3$.

A motorcycle according to still another embodiment will be described below with reference to FIGS. 13 through 18.

The motorcycle has a front cowl 40, a pair of lateral extensions 41 projecting lateraly from the front cowl 40, a pair of radiators 42 disposed in front openings 43 of the extensions 41, the extensions 41 having rear openings 44 for discharging air which has been introduced from the front openings 43 and passed through the radiators 42, a rear drive wheel 44 including a wide flat tire of a substantially U-shaped cross section, a front wheel 45 including a round tire, and a driver's riding seat 46.

An inner structure in the front cowl 40 will be described below with reference to FIG. 16. The inner structure includes a front frame 47, a main frame 48, and a seat frame 49.

The front wheel 45 is supported on a steering shaft 51 by an axle 50. The steering shaft 51 has upper and lower ends coupled by pillow balls 52, 53 to ends of upper and lower swing arms 54, 55, respectively, the other ends of which are connected to the front frame 47. The swing arms 54, 55 are vertically swingable about their joints to the front frame 47 and also about the pillow balls 52, 53.

A steering rod 57 has one end attached to the steering shaft 51 below the upper pillow ball 52. The other end of the steering rod 57 is attached to a lower portion of a handle 56 mounted on a front end of the front frame 47. The handle 56 is angularly movable in a plane normal to a plane formed by the steering shaft 51 and the upper and lower swing arms 54, 55 and substantially parallel to the upper swing arm 54.

A damper unit 58 is coupled to the lower swing arm 55 and the front frame 47 for correcting vertical movement of a front portion of the motorcycle. The damper unit 58 has one end coupled to the lower swing arm 55 by a link 59 and a bracket 60, and also to a bracket 62 mounted on the front frame 47 through the link 59 and a link 61.

An engine 63 and a transmission case 64 are mounted on the main frame 48. The main frame 48 has a base portion 65 joined coaxially to a connecting shaft 66 of the front frame 47. Footsteps 67 are mounted on a lower portion of the main frame 48.

The seat frame 49 disposed upwardly of the front frame 47 is pivotally supported on an attachment shaft 68 attached to the front frame 47 along a straight line connecting the joints between the upper and lower swing arms 54, 55 and the front frame 47. The seat frame 49 is angularly movable about the attachment shaft 68, and can bank, together with the front frame 47, about the connecting shaft 66 by which the front frame 47 and the base portion 65 of the main frame 48 are coupled to each other. The driver's riding seat 46 with a fuel tank 69 disposed therein is disposed on the seat frame 49 above the main frame 48.

Figure 18:
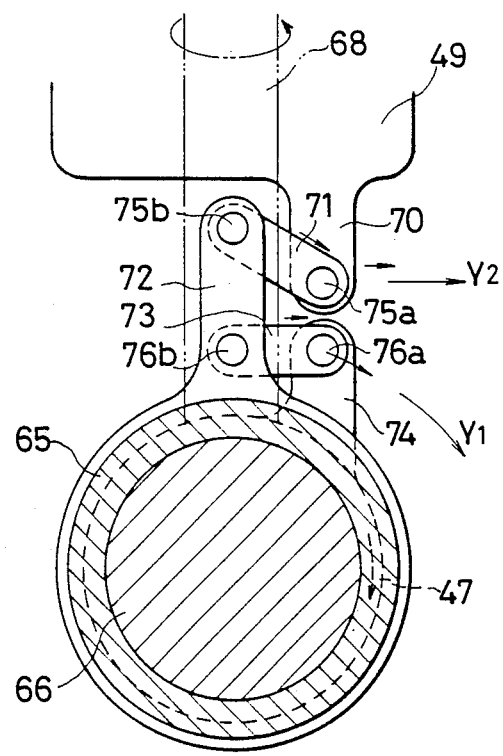
FIG. 18 is an enlarged cross-sectional view taken along line XVIII—XVIII of FIG. 16.

As shown in FIG. 18, a mechanism for angularly moving the seat frame 49 and the front frame 47 includes a connecting bracket 70 joined to the seat frame 49, a connecting member 71 pivoted to the connecting bracket 70, and a connecting member 72 pivoted to the connecting member 71 and swingable with the connecting shaft 66. The seat frame 49 is thus coupled to the main frame 48 through the connecting bracket 70 and the connecting members 71, 72. The seat frame 49 is also coupled to the front frame 47 through the connecting member 72, a connecting member 73 pivoted to the connecting member 73, and a connecting bracket 74 pivoted to the connecting member 73 and joined to the front frame 47. The bracket 70 and the connecting members 71, 72, 73 are connected by shafts 75a, 75b, 76a, 76b parallel to the connecting shaft 66, and angularly movable about these shafts 75a, 75b, 76a, 76b.

The transmission case 64 has a sprocket 78, and a sprocket 79 is attached to the axle of the rear wheel 44, with an endless chain 80a being trained around the sprockets 78, 79. Upper and lower swing arms 81, 82 have ends pivoted to the transmission case 64 and extend between the sprocket 79 and the axle of the rear wheel 44. The other ends of the upper and lower swing arms 81, 82 are coupled to upper and lower ends of a knuckle arm 80b mounted coaxially with and slidably against the axle of the rear wheel 44.

A rear cushion 85 is mounted on the main frame 48 and coupled to a lower surface of the lower swing arm 82 through a bracket 83 and a link 84.

Banking action of the motorcycle shown in FIGS. 13 through 18 will be described below.

Figure 16:
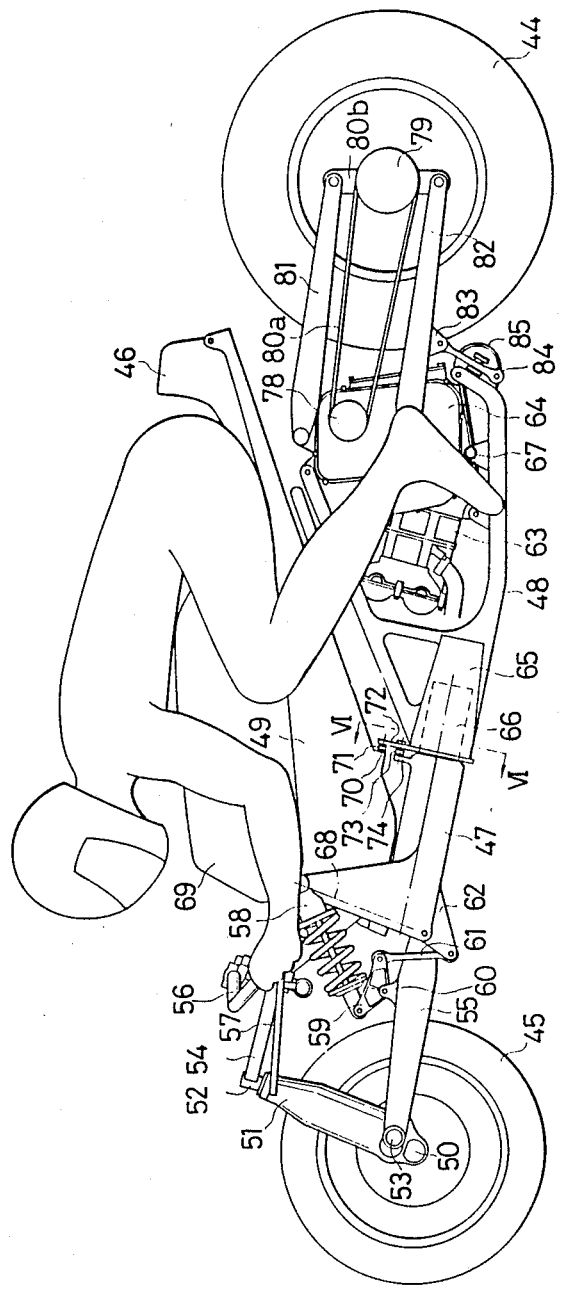
FIG. 16 is a side elevational view of an internal structure of the motorcycle shown in FIGS. 13, 14, and 15.

In FIG. 16, when the driver shifts the weight to one side in order to tilt the motorcycle upon cornering, the front frame 47 is caused to bank about the connecting shaft 66, and the front wheel 45 and the seat frame 49 are also caused to bank with the front frame 47.

The condition in which only the front frame 47 and those components coupled thereto are caused to bank will be described in detail with reference to FIG. 17.

Figure 17:
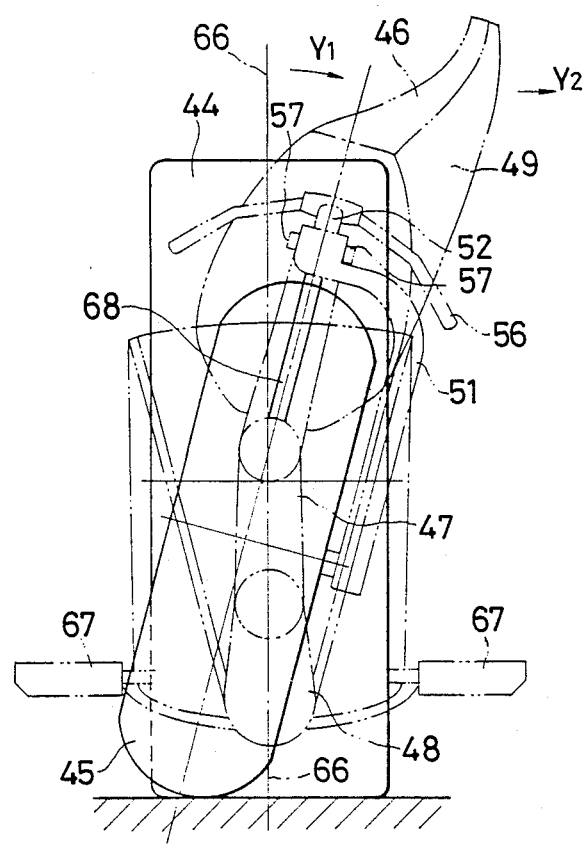
FIG. 17 is a front elevational view of the motorcycle of FIGS. 13, 14, and 15 as it banks upon cornering.

As shown in FIG. 17, the front wheel 45 and the front frame 47 are caused to bank upon cornering. The rear wheel 44 is however prevented from banking because it includes a wide flat tire and also because the front frame 47 is swingable about the connecting shaft 66.

Therefore, as illustrated in FIGS. 17 and 18, when the front frame 47 banks in the direction of the arrow Y1 upon cornering, the bracket 74 is turned to enable the seat frame 49 to bank about the connecting shaft 66 through the connecting members 73, 72, 71 and the bracket 70. At the same time, the seat frame 49 is turned about the attachment shaft 68 in the direction of the arrow Y2 which is the same as the banking direction.

Since the wide flat rear wheel 44 does not bank, it provides a large area of contact with ground upon cornering. As the front frame 47 banks, the seat frame 49 banks and swings about the attachment shaft 68. Therefore, the center of gravity of the motorcycle can be shifted laterally a large distance. As a result, the motorcycle can make a high-speed turn.

While the footsteps 67 are mounted on the main frame 48 in the above illustrated embodiment, the steps 67 may be mounted on the seat frame 49 if the angle of swinging movement of the seat frame 49 is to be increased.

Figure 19:
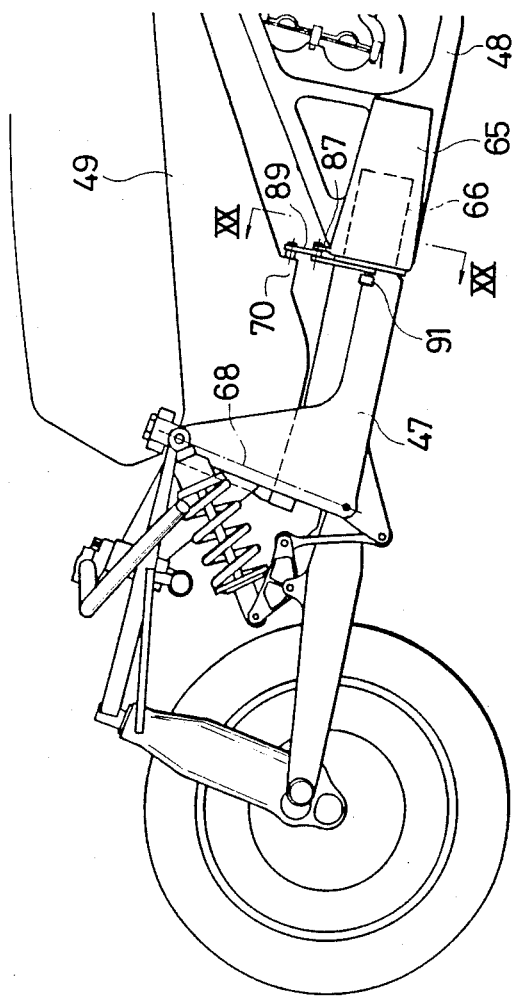
FIG. 19 is a fragmentary side elevational view of a motorcycle in accordance with yet another embodiment of the present invention.
Figure 20:
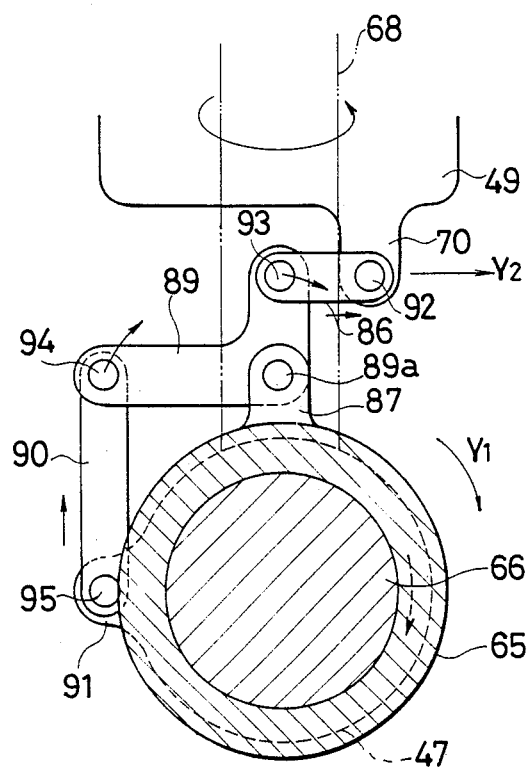
FIG. 20 is an enlarged cross-sectional view taken along line XX—XX of FIG. 19.

FIGS. 19 and 20 shows a motorcycle according to yet another embodiment of the present invention, the motorcycle being partly different from the motorcycle shown in FIG. 18. As shown in FIG. 20, the seat frame 49 is coupled to the front frame 47 through a connecting bracket 70 of the frame 49, connecting members 86, 89, 90, and a connecting bracket 91. The connecting member 89 has its intermediate portion pivotally connected to a connecting shaft 89a, parallel to the connecting shaft 66, of a connecting bracket 87 of the base portion 65, so that the connecting member 89 is coupled to the main frame 48. The brackets 70, 91 and the connecting members 86, 90, 89 are angularly movably coupled to connecting shafts 92, 93, 94, 95 parallel to the connecting shaft 66.

When the front frame 47 banks in the direction of the arrow Y1 as shown in FIG. 20, the bracket 91 is turned to enable the seat frame 49 to turn around the connecting shaft 66 in the direction of the arrow Y2 through the connecting members 90, 89, 86, 70.

Figure 21:
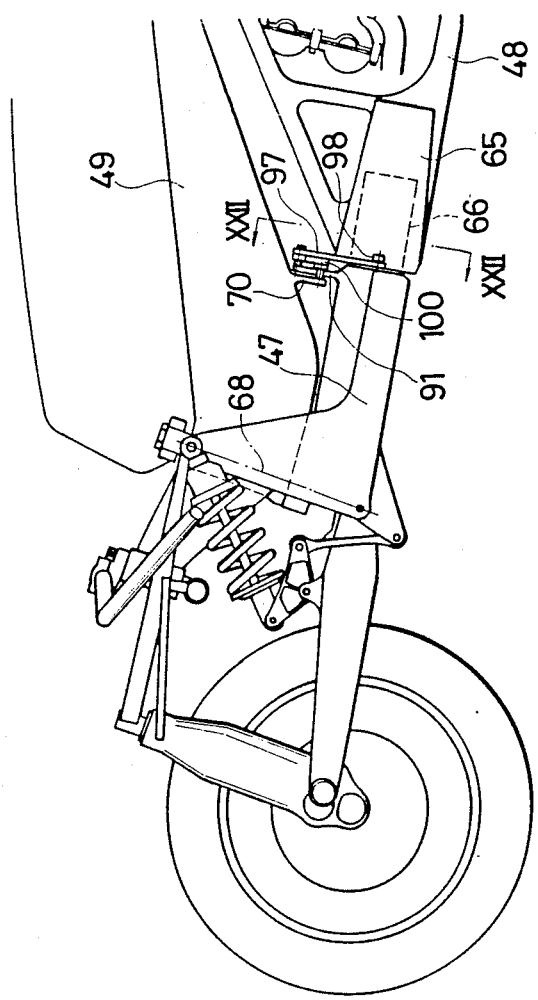
FIG. 21 is a fragmentary side elevational view of a motorcycle in accordance with yet still another embodiment of the present invention.
Figure 22:
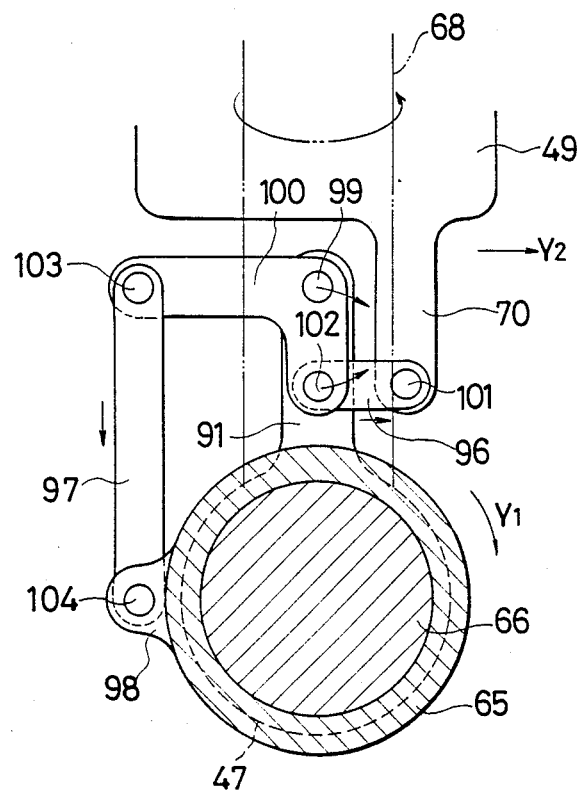
FIG. 22 is an enlarged cross-sectional view taken along line XXII—XXII of FIG. 21.

FIGS. 21 and 22 show a motorcycle according to Yet still another embodiment, the views illustrating a device or mechanism for angularly moving the seat frame. As shown in FIG. 22, the seat frame 49 is connected to the main frame 48 through the bracket 70 of the frame 49, a connecting member 96, and connecting members 100, 97 to a connecting bracket 98 of the base portion 65, so that the seat frame 49 is coupled to the main frame 48. The seat frame 49 is also connected to the front frame 47 through the connecting member 100 pivotally coupled to the connecting bracket 91 by a connecting shaft 99 parallel to the connecting shaft 66.

The brackets 70, 98 and the connecting members 96, 100, 97 are angularly movably coupled to connecting shafts 101, 102, 103, 104 parallel to the connecting shaft 66.

When the front frame 47 banks in the direction of the arrow Y1, the bracket 91 is turned to swing the connecting member 100 to cause the connecting members 96, 70 to turn the seat frame 49 about the attachment shaft 68 in the direction of the arrow Y2.

Figure 23:
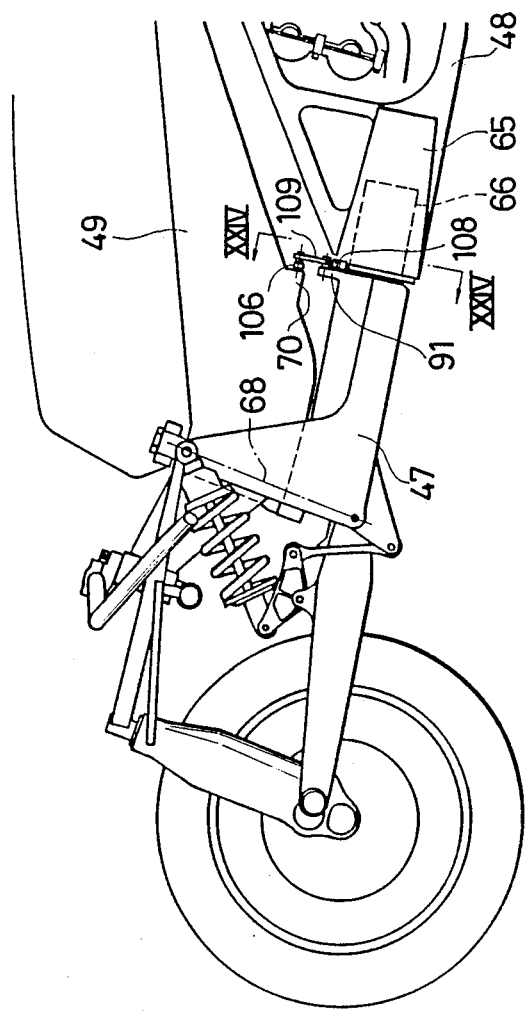
FIG. 23 is a fragmentary side elevational view of a motorcycle in accordance with a further embodiment of the present invention.
Figure 24:
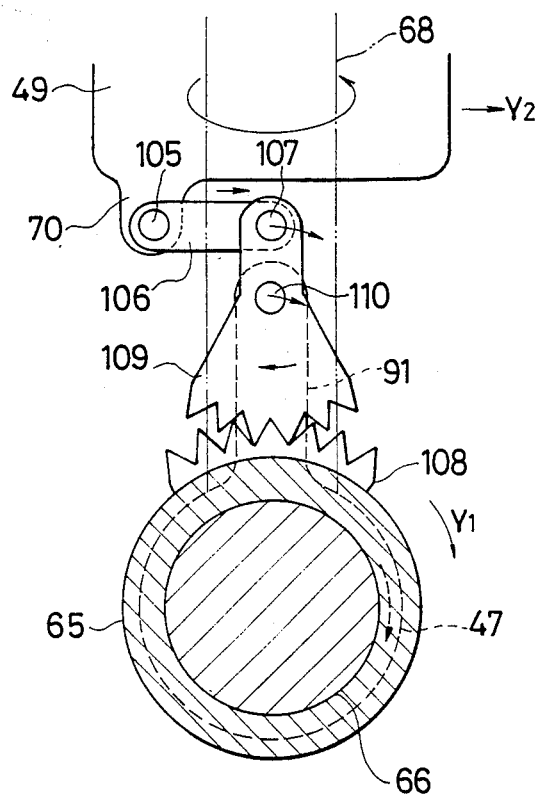
FIG. 24 is an enlarged cross-sectional view taken along line XXIV—XXIV of FIG. 23.

FIGS. 23 and 24 show a motorcycle according to a further embodiment, the views illustrating a device or mechanism for angularly moving the seat frame. As illustrated in FIG. 24, the seat frame 49 is coupled to the main frame 48 by the bracket 70 of the frame 49, a connecting member 106 having on end connected to the bracket 70 by a pivot shaft 105 parallel to the connecting shaft 66, and a movable gear 109 having one end connected to the other end of the connecting member 106 by a pivot shaft 107 parallel to the shaft 66 and the other end meshing with a fixed gear 108 on the base portion 65 of the main frame 48. The gear 109 is coupled to the front frame 47 by a connecting bracket 91 connected to an intermediate portion of the gear 109 by a pivot shaft 110 parallel to the shaft 66.

When the front frame 47 banks in the direction of the arrow Y1, the bracket 91 is turned and so is the upper end of the movable gear 109 meshing with the gear 108. The seat frame 49 is then turned about the attachment shaft 68 in the direction of the arrow Y2 through the member 106 and the bracket 70.

Figure 25:
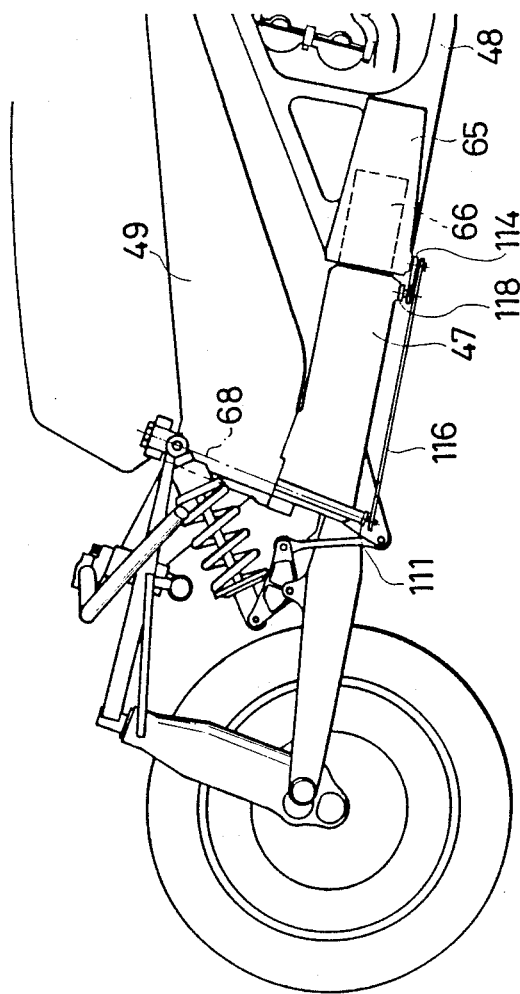
FIG. 25 is a fragmentary side elevational view of a motorcycle in accordance with a still further embodiment of the present invention.
Figure 26:
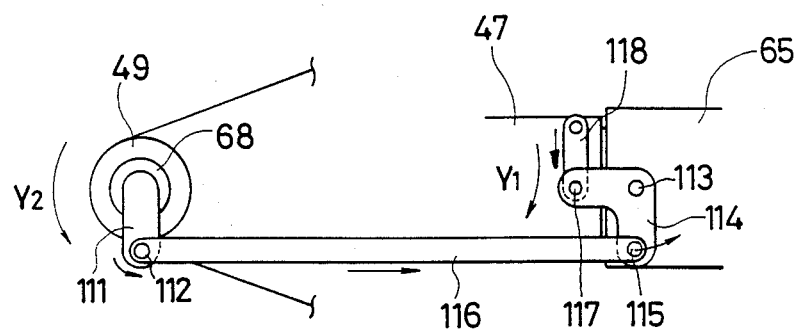
FIG. 26 is a fragmentary bottom view of the motorcycle shown in FIG. 25.

FIGS. 25 and 26 show a device or mechanism for angularly moving the seat frame of a motorcycle according to a still further embodiment of the present invention.

As illustrated in FIG. 26, the seat frame 49 is coupled to the main frame 48 by the attachment shaft 68, a connecting member 111 having one end connected to the shaft 68, and a connecting member 116 having one end coupled to the other end of the member 111 by a pivot shaft 112 and the other end connected to one end of an L-shaped connecting member 114 by a pivot shaft 115, the L-shaped connecting member 114 being swingable about an attachment shaft 113 on the base portion 65. The seat frame 49 is 118 joined to the other end of the connecting member 114 by a pivot shaft 117.

At the time the front frame 47 banks in the direction of the arrow Y1, the seat frame 49 is turned about the attachment shaft 68 in the direction of the arrow Y2 through the connecting members 118, 114, 116, 111.

The connecting member 114 may be coupled to the front frame 47, whereas the base portion 65 of the connecting member 118 may be coupled to the main frame 48.

Figure 27:
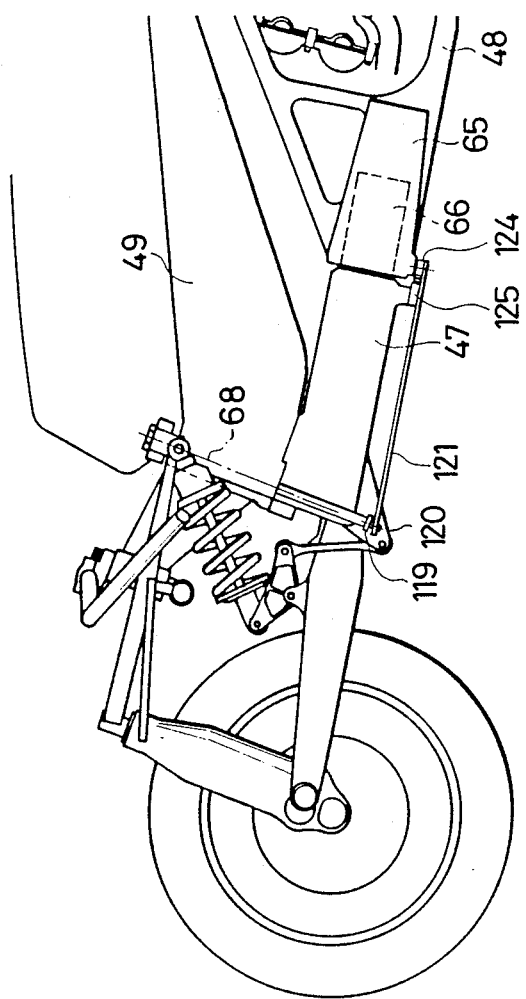
FIG. 27 is a fragmentary side elevational view of a motorcycle according to a yet further embodiment of the present invention.
Figure 28:
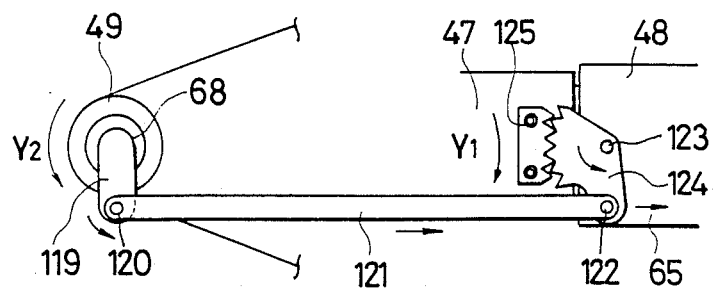
FIG. 28 is a fragmentary bottom view of the motorcycle shown in FIG. 27.

FIGS. 27 and 28 show a device or mechanism for angularly moving the seat frame of a motorcycle according to a yet further embodiment of the present invention.

As shown in FIG. 28, the seat frame 49 is coupled to the main frame 48 by the attachment shaft 68, a connecting member 119 with one end joined to the shaft 68, a connecting member 121 having one end coupled to the other end of the connecting member 119 by a pivot shaft 120, and a swing gear 124 swingably coupled to the other end of the member 121 by a pivot shaft 122, the swing gear 124 being swingable about an attachment shaft 123 on the base portion 65 of the main frame 48. The seat frame 49 is also connected to the front frame 47 through a fixed gear 125 secured to the front frame 47 and held in mesh with the swing gear 124.

When the front frame 47 banks in the direction of the arrow Y1, the seat frame 49 is turned about the shaft 68 in the direction of the arrow Y2 through the gears 125, 124 and the connecting members 121, 119.

The swing gear 124 may be mounted on the front frame 47, and the fixed gear 125 may be mounted on the base portion 65 of the main frame 48.

Figure 29:
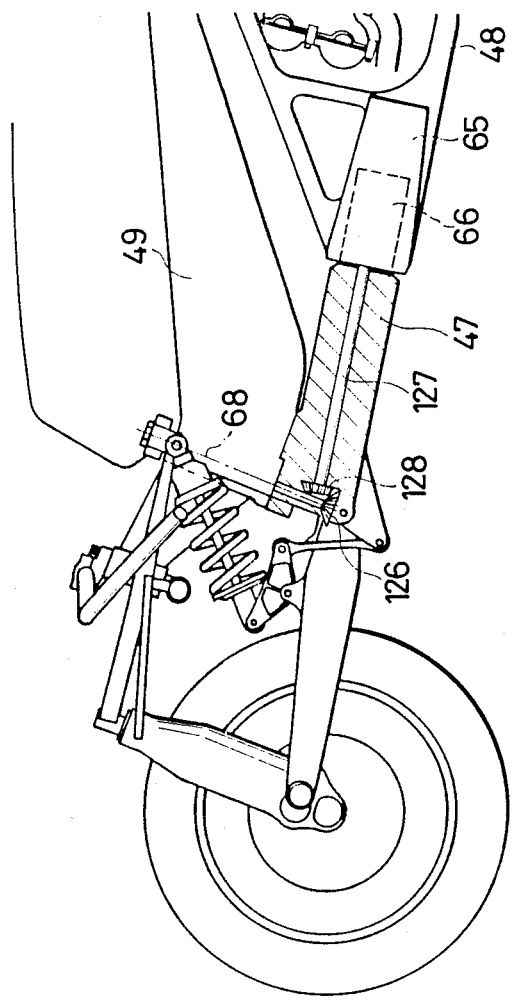
FIG. 29 is a fragmentary side elevational view of a motorcycle according to a yet still further embodiment of the present invention.
Figure 30:
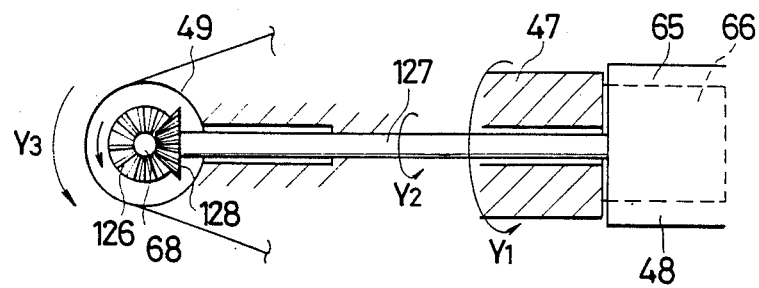
FIG. 30 is a fragmentary bottom view of the motorcycle shown in FIG. 29.

FIGS. 29 and 30 show a device or mechanism for angularly moving the seat frame of a motorcycle according to a yet still further embodiment of the present invention.

As shown in FIG. 30, the seat frame 49 is coupled to the main frame 48 by the attachment shaft 68, a bevel gear 126 mounted on the lower end of the shaft 68, and a bevel gear 128 meshing with the bevel gear 126 and mounted on an end of a connecting shaft 127 extending from the base portion 65 of the main frame 48 coaxially with the connecting shaft 66 through the front frame 47.

When the front frame 47 banks in the direction of the arrow Y1, the attachment shaft 68 is turned with the frame 47 about the connecting shaft 66. Therefore, the bevel gear 126 on the attachment shaft 68 turns in the direction of the arrow Y2 around the bevel gear 128 in mesh therewith which is secured through the shaft 127 to the base portion 65 that does not bank. The attachment shaft 68 and the seat frame 49 are therefore turned in the direction of the arrow Y3.

Figure 31:
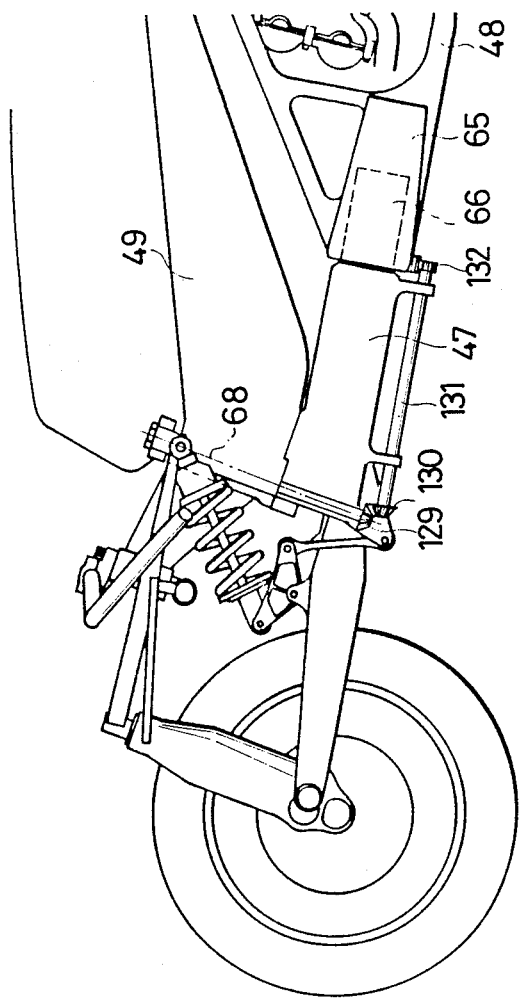
FIG. 31 is a fragmentary side elevational view of a motorcycle according to still another embodiment of the present invention.
Figure 32:
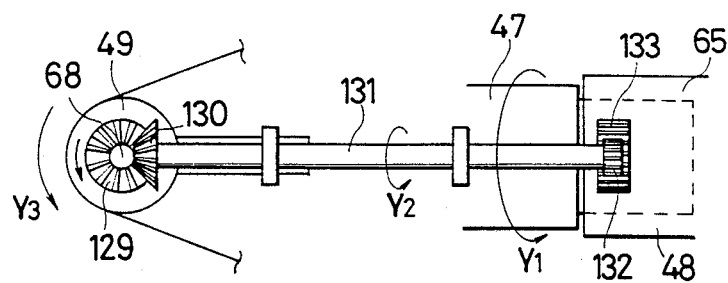
FIG. 32 is a fragmentary bottom view of the motorcycle shown in FIG. 31.

FIGS. 31 and 32 show a device or mechanism for angularly moving the seat frame of a motorcycle according to still another embodiment of the present invention.

As shown in FIG. 32, the seat frame 49 is coupled to the main frame 48 by the attachment shaft 68, a bevel gear 129 mounted on the lower end of the shaft 68, a bevel gear 130 meshing with the bevel gear 129 and mounted on one end of a connecting shaft 131, and a rotatable gear 132 mounted on the other end of the connecting shaft 131 and meshing with a fixed gear 133 fixed to the base portion 65 of the main frame 48.

Upon banking of the front frame 47 in the direction of the arrow Y1, the rotatable gear 132 rotates in the direction of the arrow Y2 in mesh with the fixed gear 133, and the gear 129 is rotated in the direction of the arrow Y3 by the gear 130, so that the seat frame 49 is turned with the shaft 68 in the direction of the arrow Y3.

Figure 33:
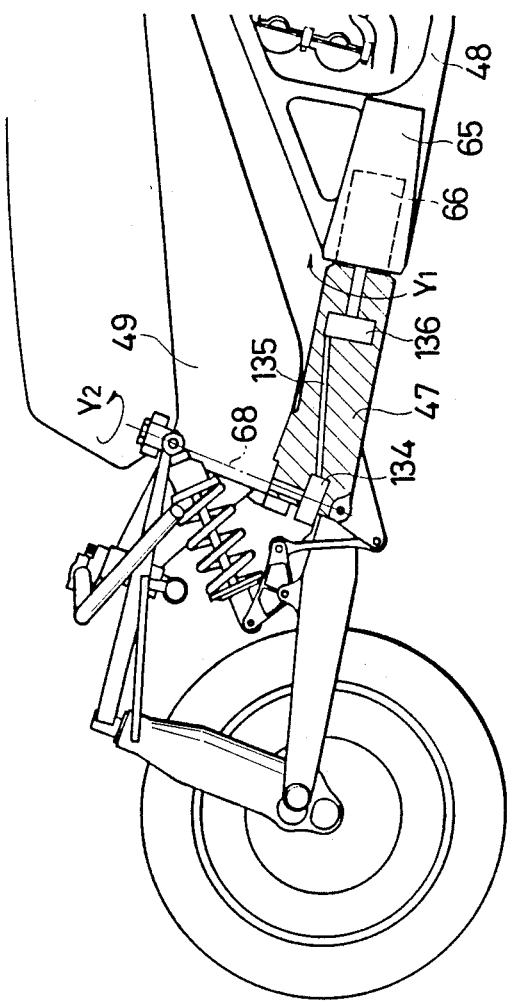
FIG. 33 is a fragmentary side elevational view of a motorcycle according to still another embodiment of the present invention.

FIG. 33 shows a motorcycle according to still another embodiment, the motorcycle having a device or mechanism for angularly moving the seat frame. In FIG. 33, the seat frame 49 is coupled to the main frame 48 by the attachment shaft 68, a hydraulic motor 134 mounted on the shaft 68, a hydraulic circuit 135 having one end connected to the hydraulic motor 135, and a hydraulic pressure generating mechanism 136 connected to the other end of the hydraulic circuit 135 and having one end coupled to the base portion 65 of the main frame 48 coaxially with the connecting shaft 66, the hydraulic pressure generating mechanism 136 being disposed in the front frame 47. The hydraulic pressure generating mechanism 136 generates a hydraulic pressure corresponding to the banking angle of the front frame 47 with respect to the base portion 65 of the main frame 48.

When the front frame 47 banks in the direction of the arrow Y1, a hydraulic pressure generated by the hydraulic pressure generating mechanism 136 is applied via the circuit 135 to the hydraulic motor 134. The shaft 68 and the seat frame 49 are turned in the direction of the arrow Y2 by a control mechanism (not shown) which controls the direction of rotation of the motor 134 according to the direction in which the front frame 47 banks.

A motorcycle according to a further embodiment of the present invention will be described with reference to FIGS. 34 through 36.

Figure 34:
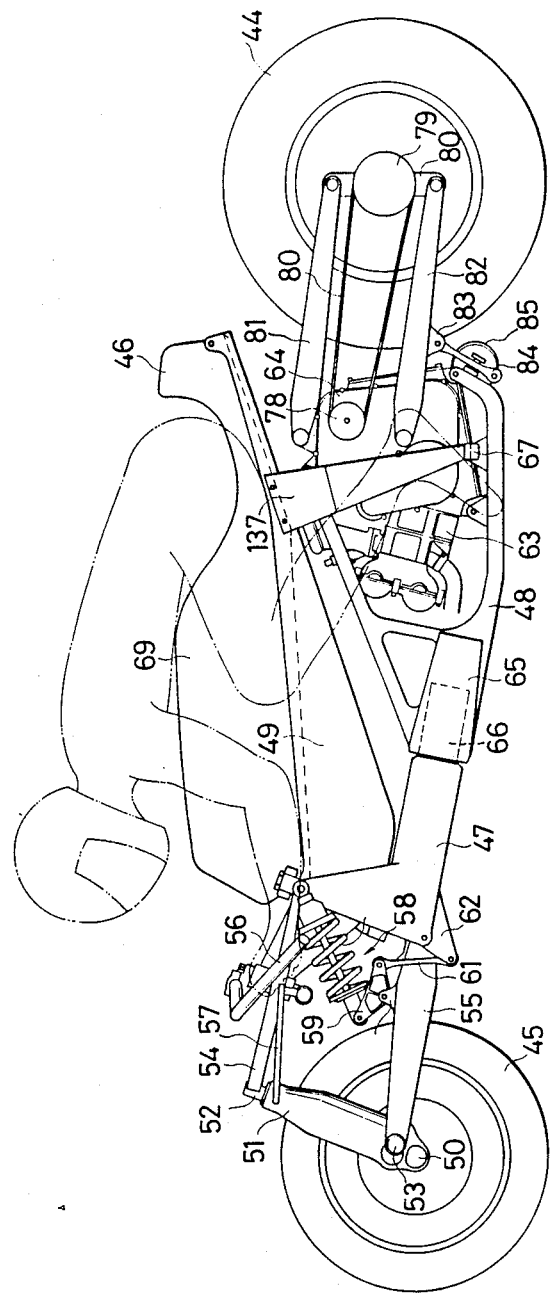
FIG. 34 is a side elevational view of an internal structure of a motorcycle according to a further embodiment of the present invention.
Figure 35:
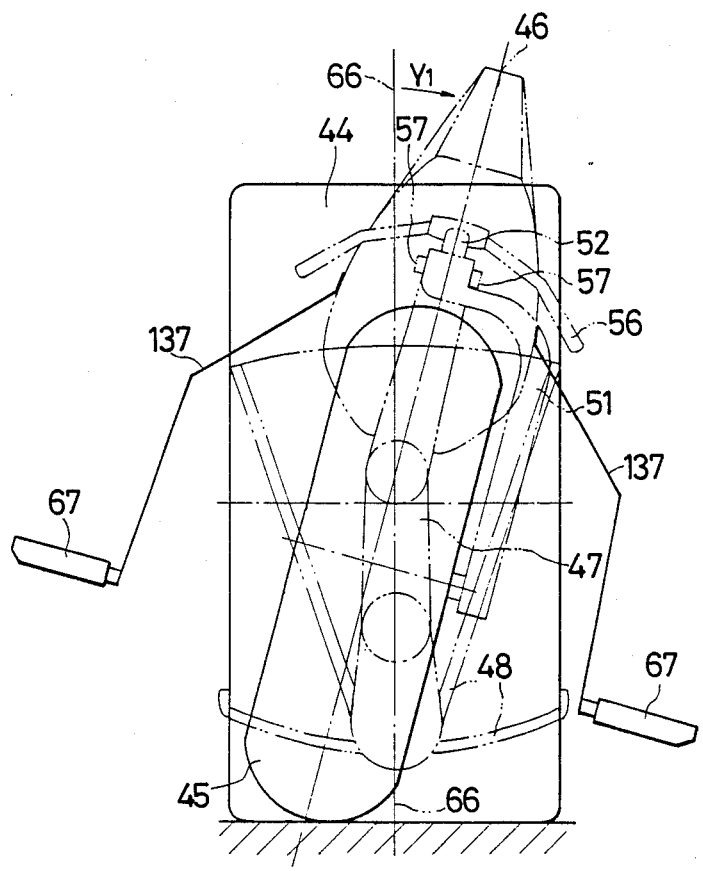
FIG. 35 is a front elevational view of the motorcycle as it banks upon cornering.
Figure 36:
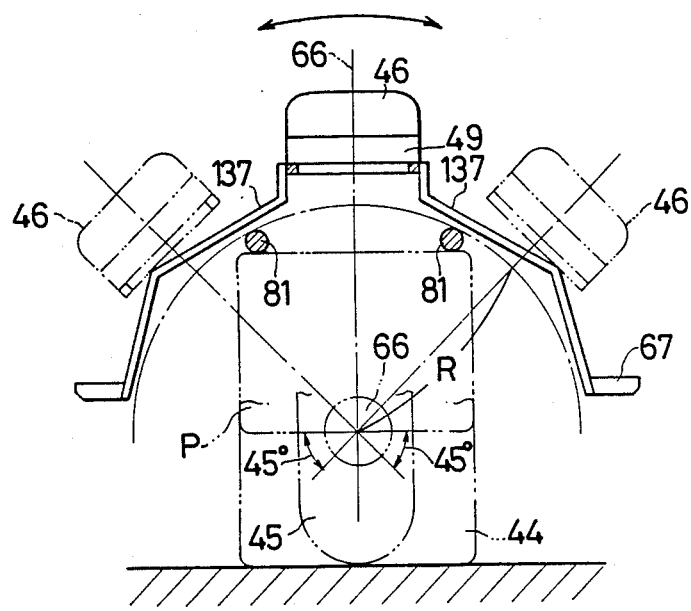
FIG. 36 is a front elevational view showing footsteps upon cornering.

The embodiment shown in FIGS. 34 through 36 is basically the same as the embodiment illustrated in FIGS. 13 through 16, except that the seat frame 49 is integrally attached to the front frame 47, the footsteps 67 are mounted on the seat frame 49, and no mechanism is provided for angularly moving the seat frame 49.

Those parts in FIG. 34 which are identical to those shown in FIG. 16 are denoted by identical reference numerals, and will not be described in detail. In this embodiment, the footsteps 67 are attached to lower portions of two attachment plates 137, respectively, which have their upper portions mounted on the seat frame 49 on both sides of the driver's riding seat 46, the attachment plates 137 lying on both sides of the main frame 48.

Banking action of the motorcycle shown in FIGS. 33 through 36 is as follows:

When the motorcycle makes a turn, the driver shifts the weight laterally to cause the motorcycle to bank. The front frame 47 banks about the connecting shaft 66, and so are those parts, such as the front wheel 45 and the driver's riding seat 46, which are mounted on the front frame 47.

The condition in which only the front frame 47 and the parts mounted thereon, including the seat frame 49, are caused to bank will be described in detail with reference to FIG. 36.

Upon cornering, the front wheel 49 banks with the front frame 47 as shown in FIG. 35. The rear wheel 44 is however prevented from banking as it has a wide flat tire of a substantially U-shaped cross section. Since the front frame 47 is rotatable about the connecting shaft 66, the rear wheel 44 and the main frame 48 do not bank.

As the rear wheel 44 does not bank, it maintain a large area of contact with ground during cornering, so that the motorcycle can perform stable cornering. Moreover, inasmuch as the footsteps 67 are attached to the seat frame 47 which can bank with the front frame 47, the driver with his legs on the footsteps 47 can easily shift the weight.

In FIG. 36, the footsteps 67 attached to the seat frame 49 are viewed in the longitudinal direction of &he motorcycle. The footsteps 67 are mounted by the attachment plates 137 disposed outside of the seat frame 49. It is assumed that the central axis of the connecting shaft 68 is spaced a distance R from a farthest point on the main frame 48 disposed inwardly of the attachment plates 137 and the power unit P mounted on the main frame 48 and including the engine 63 and the transmission case 64. The attachment plates 137 are positioned outside of and in surrounding relation to a circle having a radius R with its center located at the central axis of the connecting shaft 66. The footsteps 67 on the attachment plates 137 are directed away from the motorcycle frame. Therefore, even when the footsteps 67 and the attachment plates 137 bank with the front frame 47 about the connecting shaft 66, the footsteps 67 and the attachment plates 137 do not contact outer peripheral surfaces of the power unit P.

Although certain preferred embodiments have been shown and described, it should be understood that many changes and modifications ma be made therein without departing from the scope of the appended claims.

What is claimed is:

1. A motorcycle comprising:
   front and rear wheels, said front and rear wheels including flat tires;
   a frame assembly and a main frame, said main frame supporting said front and rear wheels on a central line thereof, said main frame being disposed below said frame assembly;
   a connecting means mounted on said main frame between said front and rear wheels;
   said frame assembly includes a subframe mounted on said connecting means and disposed above said main frame, said subframe being capable of banking laterally about said connecting means;
   a steering handle and a driver's riding seat mounted on said subframe;
   at least one of said front and rear wheels being a drive wheel, said front and rear wheels preventing said main frame from banking laterally.

2. A motorcycle according to claim 1, further including footsteps mounted on said main frame.

3. A motorcycle according to claim 1, further including a mechanism for limiting a range in which said subframe banks.

4. A motorcycle according to claim 1, wherein said connecting means includes a connecting shaft in a longitudinal direction of the frame assembly.

5. A motorcycle according to claim 1, wherein said front wheel is suspended by a first swing arm and said rear wheel is suspended by a second swing arm.

6. A motorcycle according to claim 1, wherein said rear wheel is a drive wheel and said front wheel is a steering wheel.

7. A motorcycle according to claim 6, wherein said rear wheel is associated with a rear wheel steering mechanism.

8. A motorcycle according to claim 1, wherein said subframe is disposed on said main frame above said front wheel and said rear wheel, and includes a riding seat above said rear wheel.

9. A motorcycle comprising:
front and rear wheels;
a frame assembly and a main frame disposed below said frame assembly, said main frame supporting said front and rear wheels on a central line thereof;
connection means mounted on said main frame between said front and rear wheels;
said frame assembly includes a subframe mounted on said connecting means and disposed on said main frame above said front wheel and said rear wheel, said subframe being capable of banking laterally about said connecting means and said subframe including a riding seat above said rear wheel;
at least one of said front and rear wheels being a drive wheel, said front and rear wheels including a flat tire which prevents said main frame from banking laterally.

10. A motorcycle comprising:
front and rear wheels, said front and rear wheels including flat tires;
a frame assembly and a main frame, said main frame supporting said front and rear wheels on a central line thereof, said main frame being disposed below said frame assembly;
a connecting means mounted on said main frame between said front and rear wheels;
said frame assembly includes a subframe mounted on said connecting means and disposed above said main frame, said subframe being capable of banking laterally about said connecting means;
a steering handle and a driver's riding seat mounted on said subframe;
at least one of said front and rear wheels being a drive wheel, said front and rear wheels preventing said main frame from banking laterally, said rear wheel being associated with a rear wheel steering mechanism.

* * * * *